United States Patent Office 3,528,947
Patented Sept. 15, 1970

3,528,947
DYEABLE POLYESTERS CONTAINING UNITS OF AN ALKALI METAL SALTS OF AN AROMATIC SULFONIC ACID OR ESTER THEREOF
Gerald Ray Lappin, Charles J. Kibler, John C. Gilmer, and Glenn C. Jones, Kingsport, Tenn., assignors to Eastman Kodak Company, Rochester, N.Y., a corporation of New Jersey
No Drawing. Filed Jan. 3, 1968, Ser. No. 695,349
Int. Cl. C08g *17/06, 17/08*
U.S. Cl. 260—75                                14 Claims

---

ABSTRACT OF THE DISCLOSURE

Linear, high molecular weight polyesters, such as poly(ethylene terephthalate) and poly(1,4-cyclohexylenedimethylene terephthalate), are rendered dyeable with basic dyes by incorporating in the polymer chain of said polyesters the residue of a new organic compound which is an alkali metal salt of either an aromatic sulfonic acid or an ester thereof.

---

This invention relates to new organic compounds and to polyesters modified with said new organic compounds. In one of its most specific aspects, this invention relates to polyester fibers having affinity for basic dyes.

It is well known that the dyeing of polyesters is difficult due to the lack of affinity for basic dyes. For this reason, polyester fibers are usually dyed with disperse dyes; and a dye-carrier and high temperature are required for good dyeing. However, it is sometimes difficult to obtain bright colors by this method. Therefore, the polyester industry is striving to render polyester fibers dyeable with basic dyes in order to more easily give these bright colors. As a result, sulfonic acid salts have been tested and used as modifiers to render polyester fibers dyeable with basic dyes; for example, see U.S. Pats. 3,018,272; 3,164,566; and 3,164,567. However, many of these modifiers are derivatives of monocarboxylic acids and, therefore, function as chain terminating agents when incorporated into the polyester chain. Thus, for polyesters containing these mono-functional modifiers, there is a maximum obtainable molecular weight which is determined by the concentration of the modifier. This principle of stoichiometric balance is well known in the literature; for example, see F. W. Billimeyer, "Textbook of Polymer Science," "Inter-Science Publishers (1962), at page 251.

Another disadvantage encountered by prior-used modifiers is that some sulfonate-containing monomers tend to be unstable at high temperatures, thus preventing the formation of high molecular weight polyesters and causing discolorations.

Another disadvantage is that the fibers spun from polyesters modified with some prior-used monomers may tend to degrade hydrolytically during a subsequent alkaline treatment, such as that encountered in a laundering process.

Therefore, there is a great need in the polyester industry for new organic compounds which will render polyester fibers modified therewith dyeable with basic dyes and which will avoid the above-mentioned disadvantages.

It is an object of this invention to provide new organic compounds and polyesters modified therewith wherein said new organic compound is an integral part of the polymer chain of said polyester.

It is another object of this invention to provide polyester fibers having affinity for basic dyes, wherein the dyed fibers have improved light fastness.

It is a further object of this invention to provide new modifiers which will render polyester fibers dyeable with basic dyes.

It is a still further object of this invention to provide new modifiers which will not function as chain-terminating agents, which will give substantially colorless polyesters, and which can be used in low amounts to render polyester fibers dyeable with basic dyes.

It is a still further object of this invention to provide new basic-dyeable polyesters, the fibers of which have improved hydrolytic stability.

Other objects of this invention will become apparent herein.

These and other objects are attained through the practice of this invention, one embodiment of which comprises providing new organic compounds which are alkali metal salts of either an aromatic sulfonic acid or an ester thereof, said new organic compounds having the structural formula:

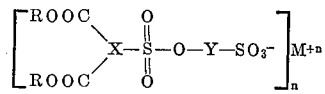

wherein X is a trivalent aromatic hydrocarbon radical; Y is a divalent aromatic hydrocarbon radical; R is hydrogen or an alkyl group of 1–4 carbon atoms (for example, methyl, ethyl, n-propyl, isopropyl, n-butyl, isobutyl, t-butyl); M is sodium, potassium, lithium, magnesium, or calcium; and $n$ is 1 or 2.

The above-referred-to radicals X and Y may be derived from either substituted or unsubstituted aromatic hydrocarbon compounds. Examples of these compounds include benzene, di-propyl benzene, naphthalene, anthracene, toluene, and xylene. The preferred compound from which X is derived is benzene. The preferred compound from which Y is derived is either benzene or naphthalene.

These and other objects are also attained through the practice of this invention, another embodiment of which comprises providing a linear, high molecular weight, basic-dyeable polyester of reactants (A) at least one dibasic acid, (B) at least one diol, and (C) a new organic compound as defined above.

These and other objects are also attained through the practice of this invention, another embodiment of which comprises spinning fibers from the above-described linear, high molecular weight, basic-dyeable polyesters containing, as an integral part of the polymer chain, said new organic compounds.

Polyester fibers which contain ionic sites such as provided by our sulfonate-containing monomers can be more easily dyed than unmodified polyesters. In addition, our modifiers give substantially no color even with such high melting polymers as poly(1,4-cyclohexylenedimethylene terephthalate). Our modified polyester fibers can be dyed with a wider range of colors than unmodified polyesters. Furthermore, the colors of our fibers have enhanced light-fastness. A further advantage is that in fabrics made using two or more different fibers (for example, cotton or unmodified polyester with our basic-dyeable polyester) may have one fiber selectively dyed without affecting the others. Thus, our basic-dyeable polyester would be dyed with a basic dye while the other fibers remain undyed. It is possible to weave patterns of such different fibers into fabric and then, by proper selection of dyes and dyeing conditions, to make many differently-finished fabric styles. For example, by proper dyeing, a fabric could have colored stripes on white or a different color, checks on white or a different color, or be one solid color. It is because of the versatility they offer that basic-dyeable polyester fibers are in great demand.

These polyesters suitable for modification by our new organic compounds include any linear, high molecular weight, fiber- or film-forming polyester of (A) at least one difunctional dicarboxylic acid and (B) at least one difunctional glycol. Suitable acids for preparing these polyesters are aliphatic, alicyclic, and aromatic dicarboxylic acids. Examples of such acids include oxalic, malonic; dimethylmalonic; succinic; glutaric; adipic; trimethyl adipic; pimelic; 2,2-dimethylglutaric; azelaic; sebacic fumaric maleic; itaconic; 1,3-cyclopentane dicarboxylic; 1,2-cyclohexanedicarboxylic; 1,3-cyclohexanedicarboxylic; 1,4-cyclohexanedicarboxylic; phthalic; terephthalic; isophthalic; t-butyl isophthalic; 2,5-norbornane dicarboxylic; 1,4-naphthalic; diphenic; 4,4'-oxydibenzoic; diglycolic; thiodipropionic; 2,2,4-trimethyladipic; 4,4'-sulfonyldibenzoic; 2,5-naphthalene dicarboxylic; 2,6-naphthalene dicarboxylic; and 2,7-naphthalene dicarboxylic acids. It will be understood that the corresponding esters of these acids are included in the term "dicarboxylic acid." Examples of these esters include dimethyl 1,4-cyclohexanedicarboxylate; dimethyl 2,6-naphthalenedicarboxylate; dimethyl 4,4'-sulfonyldibenzoate; dimethyl isophthalate; dimethyl terephthalate; and diphenyl terephthalate. Copolyesters may be prepared from two or more of the above dicarboxylic acids or esters thereof.

Suitable glycols for preparing these polyesters are aliphatic, alicyclic, and aromatic diols. Examples of such diols include ethylene glycol; diethylene glycol; 2,2-dimethyl-1,3-propanediol; 2 - ethyl-2-butyl-1,3-propanediol; 2,2 - diethyl - 1,3-propanediol; 2-methyl-2-propyl-1,3-propanediol; 2-ethyl-2-isobutyl-1,3-propanediol; 1,4-butanediol; 1,5-pentanediol; 1,6-hexanediol; 2,2,4-trimethyl-1,6-hexanediol; 1,2-cyclohexanedimethanol; 1,3-cyclohexanedimethanol; 1,4-cyclohexane-dimethanol; 2,2,4,4-tetramethyl-1,3-cyclobutanediol; o-, m-, and p-xylylene diols; and 4,4'-isopropylidenediphenol. Copolyesters may be prepared from two or more of the above diols.

Especially preferred polyesters are poly(ethylene terephthalate) and poly(1,4-cyclohexylenedimethylene terephthalate).

To obtain the modified polyesters of this invention, the modifier may simply be added directly to the reaction mixture from which the polyester will be made. Thus, these modifiers can be used as a component monomer in the original polyester reaction mixture. This mixture is then reacted to form the polyester from which fibers can be spun. The methods and details thereof by which these steps are carried out are well known to the polyester industry and, therefore, need not be specifically set forth herein.

The new organic compounds of this invention are unexpectedly resistant to hydrolysis and have improved stability to cleavage by glycols under the conditions required for forming polyesters. These new compounds may be prepared as shown by the following general reactions which are exemplified in the example below:

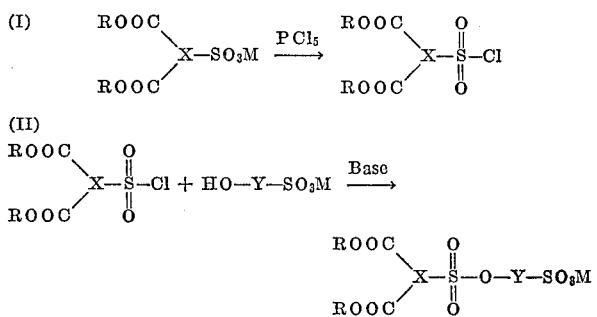

Many variations of these reactions may be employed. For example, the sulfonyl chloride intermediate may be prepared from either the sulfonic acid or a salt thereof, and other chlorinating agents (e.g., thionyl chloride, phosphorus trichloride, phosphorous oxychloride) may be used. In addition, the reaction between the sulfonyl chloride and the sulfophenol may be carried out in water or an inert organic solvent, and the base used may be an alkali metal hydroxide or a tertiary amine.

Examples of preferred modifiers include:

(A) 4 - sodiosulfophenyl-3,5-dicarbomethoxybenzenesulfonate

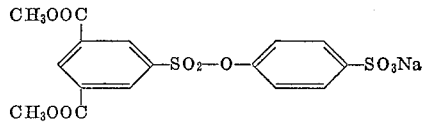

(B) 4 - lithiosulfophenyl-3,5-dicarbomethoxybenzenesulfonate

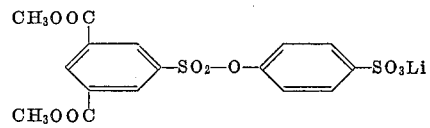

(C) 4 - sodiosulfo - 2,6-dimethylphenyl-3,5-dicarbomethoxybenzenesulfonate

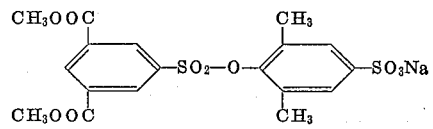

(D) 4-sodiosulfo-2,6-dipropylphenyl-3,5-dicarbomethoxybenzenesulfonate

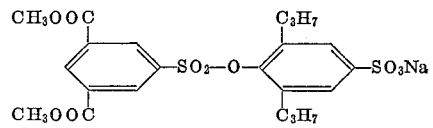

(E) 4-sodiosulfo-1-naphthyl-3,5-dicarbomethoxybenzenesulfonate

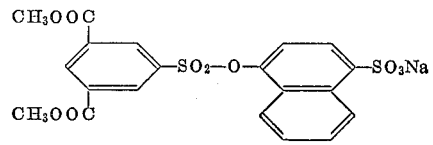

(F) 5-sodiosulfo-1-naphthyl-3,5-dicarbomethoxybenzenesulfonate

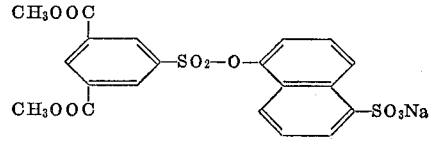

(G) 6-sodiosulfo-1-naphthyl-3,5-dicarbomethoxybenzenesulfonate

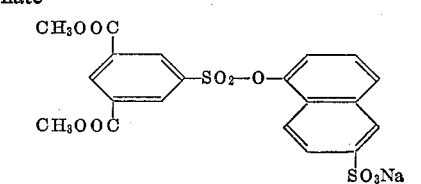

(H) 4 - sodiosulfophenyl-3,5-dicarboethoxybenzenesulfonate

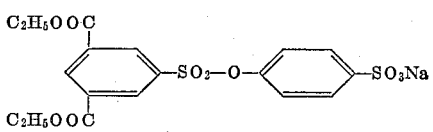

(I) 4 - sodiosulfophenyl-3,5-dicarbopropoxybenzenesulfonate

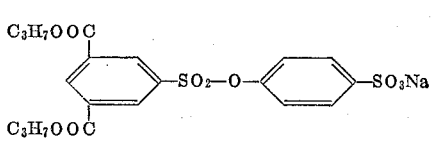

EXAMPLE 3

Preparation of 4-lithiosulfophenyl-3,5-dicarbomethoxybenzenesulfonate

The product of Example 2 is dissolved in water and passed through a strongly acidic ion-exchange-resin column to give a water solution of the free sulfonic acid. This is then neutralized with lithium hydroxide. After concentrating and cooling, the desired lithium salt is obtained. NMR analysis shows the product to be the desired compound.

Other metallic salts such as the potassium, calcium, and magnesium salts can be prepared in the same way by substituting the appropriate metal hydroxide or carbonate for the lithium hydroxide used in this example.

EXAMPLE 4

Preparation of 6-sodiosulfate-2-naphthyl-3,5-dicarbomethoxybenzenesulfonate

A mixture of 12 grams (0.04 mole) 3,5-dicarbomethoxybenzenesulfonyl chloride, 10.1 grams (0.04 mole) 2-naphthol-6-sulfonic acid, sodium salt, 1.64 grams (0.04 mole) sodium hydroxide, and 100 ml. demineralizd water is shaken for ten minutes. The mixture is then heated on the steam bath for one hour. Solution is complete after 30 minutes. The hot solution is treated with Norite and filtered. The white crystals that result when the filtrate cools are filtered and air dried—7.5 grams. The product is recrystallized from ethanol-water (10:1). A nuclear magnetic resonance spectrum of the material is consistent with that for 6-sodiosulfo-2-naphthyl-3,5-dicarbomethoxybenzenesulfonate.

A polymer consisting of 2.5 mole percent of this material in poly(ethylene terephthalate) is prepared and dyed a brilliant red by Basacryl Red GL (Colour Index Name, Basic Red 29), a basic dye sold by Badische Anilin and Soda-Fabrik AG. Unmodified poly(ethylene terephthalate) is not dyed appreciably by this dye.

EXAMPLE 5

Poly(ethylene terephthate) containing 4-sodiosulfophenyl-3,5-dicarbomethoxybenzenesulfonate A mixture of 97 grams (0.5 mole) dimethyl terephthlate (DMT), 62 grams (1.0 mole) ethylene glycol (EG), and a catalyst solution containing .012 gram of zinc acetate, and a 0.039 gram of antimony acetate is stirred and heated at 210° C. until the evolution of methanol ceases, about two hours. The temperature is then raised to 240° C., and a solution of 0.02 gram of diethyl hydrogen phosphate is added. This mixture is stirred ten minutes at 240° C. To it is then added 5.65 grams of 4-sodiosulfophenyl-3,5-dicarbomethoxybenzenesulfonate, after which the temperature is raised to 275° C., and the reaction vessel is evacuated to a pressure of about 0.2 mm. Hg. The mixture is stirred one hour at 275° C. under vacuum and then cooled (still under vacuum). The resulting polymer has an I.V. of 0.58. This polymer is spun into fibers. These fibers are dyed a brilliant red by Basacryl Red GL. Similar fibers not containing this modifier are not appreciably dyed under the same conditions.

EXAMPLE 6

Poly(ethylene terephthalate) containing 4-sodiosulfo-2,6-dimethylphenyl-3,5-dicarbomethoxybenzenesulfonate A polymer is prepared as in Example 5 except that 5.8 grams of 4-sodiosulfo-2,6-dimethylphenyl-3,5-dicarbomethoxybenzenesulfonate is used in place of the sulfonate modifier of Example 5. The resulting polymer, I.V. 0.71, is spun into fibers. These fibers are dyed a brilliant red by Basacryl Red GL.

EXAMPLE 7

Poly(ethylene terephthalate) containing 4-sodiosulfophenyl-3,5-dicarbomethoxybenzenesulfonate and a modifying glycol A polymer is prepared as in Example 5 except that the glycol portion consists of 56 grams of EG and 7.2 grams of 1,4-cyclohexanedimethanol (1,4-CHDM). The sulfonate modifier of Example 1 is used. The resulting polymer, I.V. 0.62, is spun into fibers which are dyed a brilliant red by Basacryl Red GL. Similar fibers not containing this modifier are not appreciably dyed by this dye.

EXAMPLE 8

Poly(1,4-cyclohexylenedimethylene terephthalate) containing 4-sodiosulfophenyl-3,5-dicarbomethoxybenzenesulfonate A polymer is prepared as in Example 5 except that in place of the EG, 80 grams of 1,4-CHDM is used. The final polymerization temperature is 290° C. The same sulfonate modifier is used. The resulting polymer has an I.V. of 0.58 and gives fibers which are dyed a brilliant red by Basacryl Red GL. Similar fibers not containing this modifier are not appreciably dyed by this dye.

EXAMPLE 9

Poly(1,4-cyclohexylenedimethylene terephthalate) containing 4-sodiosulfophenyl-3,5-dicarbomethoxybenzenesulfonate and a modifying dibasic acid A polymer is prepared as in Example 8 except that the initial dibasic acid ester charge consists of 88 grams of DMT and 9.7 grams of dimethyl isophthalate. The same sulfonate modifier is used. The resulting polymer, I.V. 0.66, is spun into fibers which are dyed a brilliant red by Basacryl Red GL. Similar fibers not containing this modifier are dyed a pale, dull red by this dye.

The invention has been described in detail with particular reference to preferred embodiments thereof, but it will be understood that variations and modifications can be effected within the spirit and scope of this invention as described hereinabove and as defined in the appended claims.

We claim:

1. A linear, film and fiber forming, high molecular weight polyester of reactants (A) at least one aliphatic, alicyclic or aromatic dicarboxylic acid or a methyl or phenyl ester thereof, (B) at least one aliphatic, alicyclic or aromatic diol, and (C) from about 1.0 to about 10 mole percent of an organic compound having the structural formula:

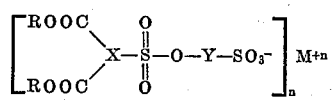

wherein the term X is a trivalent aromatic hydrocarbon radical, Y is a divalent aromatic hydrocarbon radical, R is hydrogen or an alkyl group of 1–4 carbon atoms, M is sodium, potassium, lithium, magnesium or calcium, n is 1 or 2, and said mole percent is based on the sum of the moles of said dicarboxylic acid (A) and said organic compound (C).

2. A linear, high molecular weight polyester as defined by claim 1 wherein said organic compound has the structural formula:

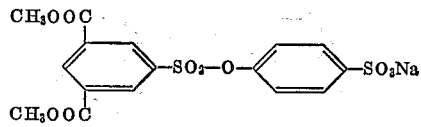

3. A linear, high molecular weight polyester as defined by claim 1 wherein said organic compound has the structural formula:

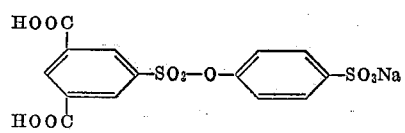

(J) 4-sodiosulfophenyl-3,5-dicarbobutoxybenzenesulfonate

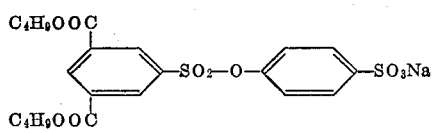

(K) 3-sodiosulfophenyl-3,5-dicarbomethoxybenzenesulfonate

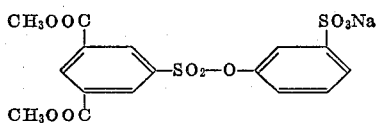

(L) 4-sodiosulfophenyl-3,5-dicarboxybenzenesulfonate

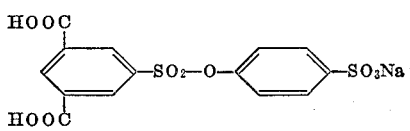

(M) 4-sodiosulfophenyl-3,4-dicarbomethoxybenzenesulfonate

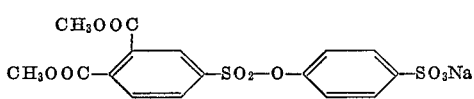

(N) 4-sodiosulfophenyl-2,5-dicarbomethoxybenzenesulfonate

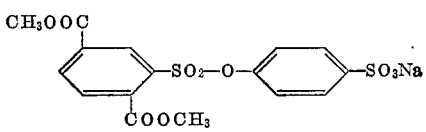

(O) 2-sodiosulfophenyl-3,5-dicarbomethoxybenzenesulfonate

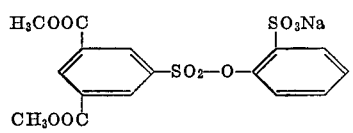

(P) 4-potassiosulfophenyl-3,5-dicarbomethoxybenzenesulfonate

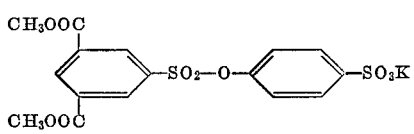

(Q) 7-sodiosulfo-1-naphthyl-3,5-dicarbomethoxybenzenesulfonate

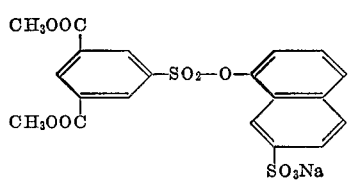

(R) 8-sodiosulfo-1-naphthyl-3,5-dicarbomethoxybenzenesulfonate

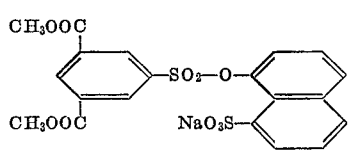

(S) 6-sodiosulfo-2-naphthyl-3,5-dicarbomethoxybenzenesulfonate

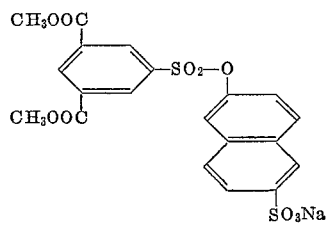

In the new organic compounds of this invention, the two functional groups on the trivalent radical X may be in any positional relationship to each other and to the metallic sulfonate group.

We have found that affinity for basic dyes is achieved when the polyester contains from about 1.0 to about 10 mole precent of the new modifier. Especially good affinity for basic dyes is obtained when the polyester contains from about 1.0 to about 3.0 mole percent of the new modifier.

The modified polyesters of this invention preferably have an inherent viscosity of at least 0.35. Whenever the term "inherent viscosity" (I.V.) is used in this application, it will be understood to refer to viscosity determinations made at 25° C. using 0.25 grams of polymer per 100 ml. of a solvent composed of 60 percent phenol and 40 percent tetrachloroethane.

Various additives, such as stabilizers, dyes, pigments, and slip agents, may be added to the polyester to enhance particular properties.

This invention will be further illustratd by the following examples.

EXAMPLE 1

Preparation of 3,5-dicarbomethoxybenzenesulfonyl chloride

A mixture of 272 grams (1.0 mole) of dimethyl 5-sodiosulfoisophthalate and 208 grams (1.0 mole) of phosphorus pentachloride is stirred and heated at 165°–170° C. for 11 hours. The reaction mixture is added to 1,500 ml. of ice and water, and this mixture is stirred for 15 minutes at 0° C. It is then stirred and heated at 40° C. for 30 minutes. The product is collected by filtration, dried, and recrystallized from hexane to give 212 grams of white solid, M.P. 107°–108° C. It is identified as the desired compound by its infrared spectrum.

*Analysis.*—Calcd. for $C_{10}H_9O_6Cl$ (percent): C, 41.1; H, 3.1; Cl, 12.2; S, 11.0; mol. wt. 292.7. Found (percent): C, 41.25; H, 3.22; Cl, 12.2; S, 10.79; mol. wt., 288.7.

EXAMPLE 2

Preparation of 4-sodiosulfophenyl-3,5-dicarbomethoxybenzenesulfonate

To a solution of 96 grams (0.4 mole) p-phenolsulfonic acid sodium salt and 16.6 grams of sodium hydroxide in 500 ml. of water is added 120 grams (0.4 mole) of 3,5-dicarbomethoxybenzene sulfonyl chloride. This mixture is heated on the steam-bath for 30 minutes. The hot solution is treated with decolorizing charcoal, filtered, and cooled. The product is collected by filtration and dried to give 130 grams of white solid. The nuclear magnetic resonance spectrum (NMR spectrum) shows this material to be essentially pure 4-sodiosulfophenyl-3,5-dicarbomethoxybenzenesulfonate. The melting point of this product as determined using differential thermal analysis is 246° C. A sample of this material is recrystallized from 95 percent ethanol.

*Analysis.*—Calcd. for $C_{16}H_{13}NaO_{10}S_2 \cdot \frac{1}{2}H_2O$ (percent): C, 41.6; H, 3.1; S, 13.9. Found (percent): C, 41.3; H, 3.1; S, 13.6.

4. A linear, high molecular weight polyester as defined in claim 1 wherein said organic compound has the structural formula:

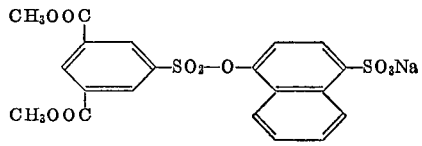

5. A linear, high molecular weight polyester as defined by claim 1 wherein said organic compound has the structural formula:

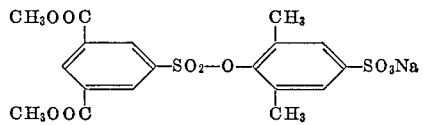

6. A linear, high molecular weight polyester as defined by claim 1 wherein said organic compound has the structural formula:

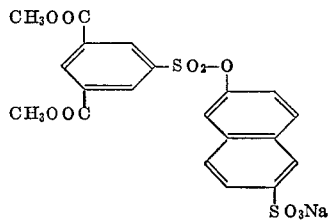

7. A linear, high molecular weight polyester as defined by claim 1 wherein said organic compound has the structural formula:

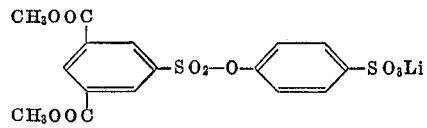

8. A fiber of the polyester as defined by claim 1.
9. A fiber of the polyester as defined by claim 2.
10. A fiber of the polyester as defined by claim 3.
11. A fiber of the polyester as defined by claim 4.
12. A fiber of the polyester as defined by claim 5.
13. A fiber of the polyester as defined by claim 6.
14. A fiber of the polyester as defined by claim 7.

References Cited

UNITED STATES PATENTS 3,057,827  10/1962  Griffing _____ 260—75
3,296,204  1/1967   Caldwell _____ 260—49
3,314,920  4/1967   Sakurai et al. _____ 260—75

HAROLD D. ANDERSON, Primary Examiner

L. L. LEE, Assistant Examiner

U. S. Cl. X.R.

8—55; 260—40, 457, 47, 456